United States Patent
Liao et al.

(10) Patent No.: US 8,525,879 B2
(45) Date of Patent: Sep. 3, 2013

(54) DEPTH DETECTION METHOD AND SYSTEM USING THEREOF

(75) Inventors: Chih-Pin Liao, Xinshi Township, Tainan County (TW); Yao-Yang Tsai, Kaohsiung (TW); Jay Huang, Tainan (TW); Ko-Shyang Wang, Kaoshiung (TW)

(73) Assignee: Industrial Technology Research Institute, Hsinchu (TW)

( * ) Notice: Subject to any disclaimer, the term of this patent is extended or adjusted under 35 U.S.C. 154(b) by 398 days.

(21) Appl. No.: 12/842,277

(22) Filed: Jul. 23, 2010

(65) Prior Publication Data

US 2011/0141274 A1  Jun. 16, 2011

(30) Foreign Application Priority Data

Dec. 15, 2009  (TW) .............................. 98143011 A

(51) Int. Cl.
*H04N 7/18* (2006.01)
(52) U.S. Cl.
USPC ............ 348/139; 382/154; 348/163; 348/175
(58) Field of Classification Search
USPC .......................... 382/154; 384/163; 348/175
See application file for complete search history.

(56) References Cited

U.S. PATENT DOCUMENTS

| | | | |
|---|---|---|---|
| 5,446,548 A | 8/1995 | Gerig et al. | |
| 5,867,591 A | 2/1999 | Onda | |
| 6,487,304 B1 | 11/2002 | Szeliski | |
| 6,608,923 B1 | 8/2003 | Zhang et al. | |
| 6,718,062 B1 | 4/2004 | Zhang et al. | |
| 6,771,303 B2 | 8/2004 | Zhang et al. | |
| 6,771,810 B1 | 8/2004 | Zhang et al. | |
| 6,931,150 B2 * | 8/2005 | Zhang et al. | 382/154 |
| 7,031,497 B2 * | 4/2006 | Trajkovi | 382/107 |
| 7,058,204 B2 | 6/2006 | Hildreth et al. | |
| 7,106,899 B2 * | 9/2006 | Zhang et al. | 382/154 |
| 7,164,790 B2 * | 1/2007 | Zhang et al. | 382/154 |
| 7,376,284 B2 | 5/2008 | Tao et al. | |

(Continued)

FOREIGN PATENT DOCUMENTS

| | | |
|---|---|---|
| CN | 101563709 A | 10/2009 |
| TW | I293110 | 4/2007 |
| TW | 200719871 A | 6/2007 |

OTHER PUBLICATIONS

English language translation of abstract of TW I293110 (published Apr. 27, 2007).

(Continued)

*Primary Examiner* — Christopher S Kelley
*Assistant Examiner* — Deirdre Beasley
(74) *Attorney, Agent, or Firm* — McClure, Qualey & Rodack, LLP

(57) ABSTRACT

A depth detection method includes the following steps. First, first and second video data are shot. Next, the first and second video data are compared to obtain initial similarity data including r×c×d initial similarity elements, wherein r, c and d are natural numbers greater than 1. Then, an accumulation operation is performed, with each similarity element serving as a center, according to a reference mask to obtain an iteration parameter. Next, n times of iteration update operations are performed on the initial similarity data according to the iteration parameter to generate updated similarity data. Then, it is judged whether the updated similarity data satisfy a character verification condition. If yes, the updated similarity data is converted into depth distribution data.

8 Claims, 4 Drawing Sheets

(56) References Cited

U.S. PATENT DOCUMENTS

| | | |
|---|---|---|
| 7,382,897 B2 | 6/2008 | Brown et al. |
| 7,477,236 B2 | 1/2009 | Ofek et al. |
| 7,486,815 B2 | 2/2009 | Kristjansson et al. |
| 7,526,401 B2 | 4/2009 | Krumm |
| 2004/0228521 A1 | 11/2004 | Jeong et al. |
| 2006/0029272 A1 | 2/2006 | Ogawa |
| 2008/0266391 A1 | 10/2008 | Lee et al. |

OTHER PUBLICATIONS

English Abstract Translation of CN101563709 (Published Oct. 21, 2009).

TW Office Action dated Feb. 23, 2013.

\* cited by examiner

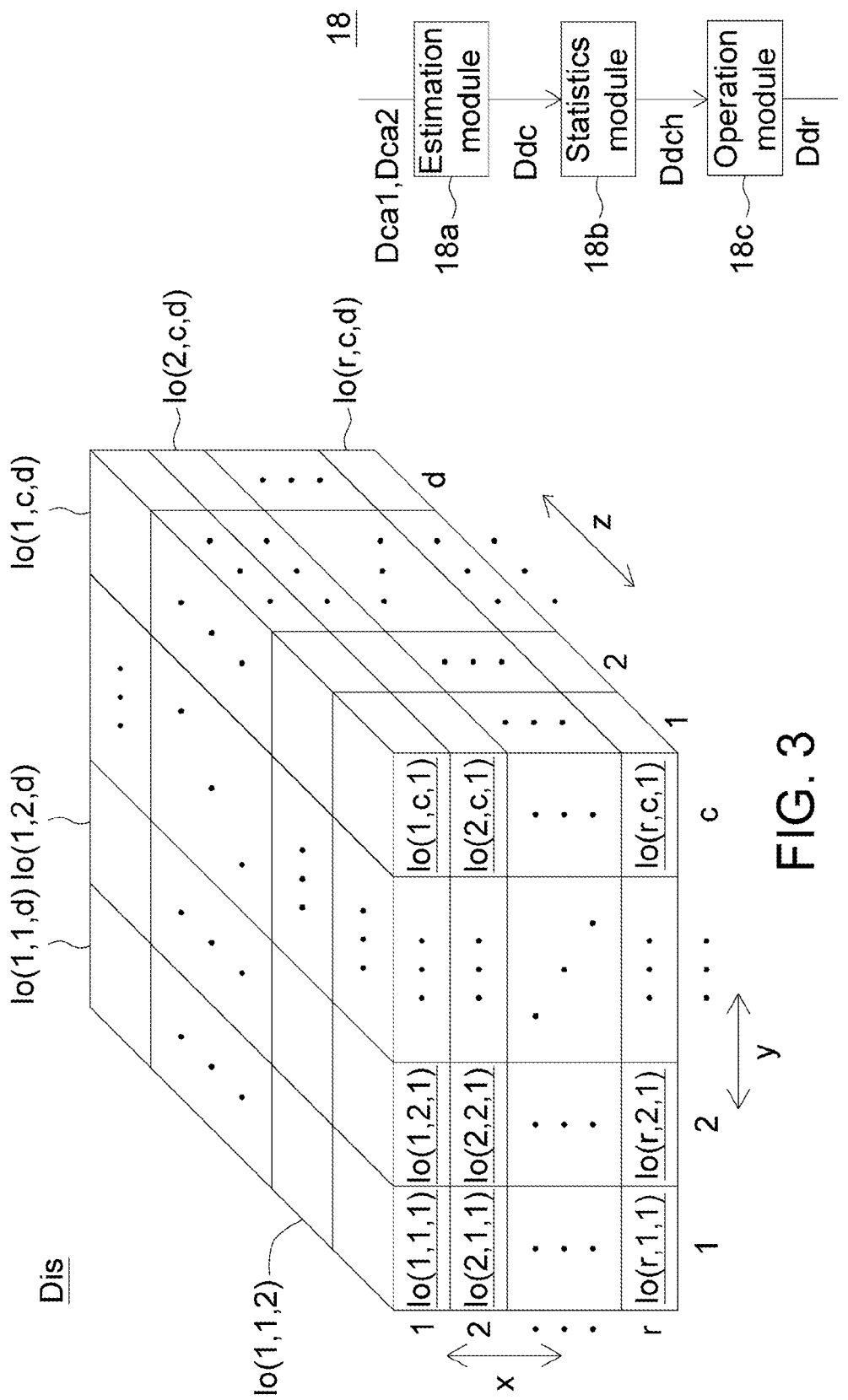

DEPTH DETECTION METHOD AND SYSTEM USING THEREOF

This application claims the benefit of Taiwan application Serial No. 098143011, filed Dec. 15, 2009, the subject matter of which is incorporated herein by reference.

TECHNICAL FIELD

The disclosure relates in general to a depth detection system, and more particularly to a depth detection system for obtaining more reliable depth data using the motion adjustment reference mask technology.

BACKGROUND

In the modern age, in which the technology is growing with each passing day, the digital content industry including computer motion pictures, digital games, digital learning and mobile applications and services is developed in a flourishing manner. In the existing technology, the stereoscopic image/video has existed, and is expected to enhance the service quality of the digital content industry.

Generally speaking, the conventional depth data detecting system adopts the dual camera technology to shoot the target at left and right viewing angles to obtain the left video data and the right video data, and calculates the depth data of each corresponding object according to horizontal offsets between the corresponding left and right video data of the corresponding objects. Generally speaking, the accuracy of the depth data significantly affects the quality of the stereoscopic image data. Thus, it is an important subject of this field to design a depth detection system capable of generating the accurate depth data.

SUMMARY

The disclosure is directed to a depth detection system adopting a depth estimation apparatus to estimate similarity data of pixel data between left viewing angle video data and right viewing angle video data; to generate a converging parameter through a reference mask according to the similarity data in a selected reference region; and to perform a cyclic iteration operation on the similarity data according to the converging parameter so as to obtain the disparity of each pixel data in the left/right viewing angle video data. The depth detection system of the disclosure further adopts the depth estimation apparatus to verify the disparity, and selectively adjusts the size of the reference mask according to the verified result so as to obtain the disparity of each pixel data with the higher reliability and to correspondingly generate depth information. Thus, compared with the conventional depth detection system, the depth detection system of the disclosure generates the depth information with the higher reliability.

According to a first aspect of the present disclosure, a depth detection system including a dual camera apparatus, a horizontal calibration apparatus and a depth estimation apparatus is provided. The dual camera apparatus shoots first video data and second video data, which respectively correspond to a first viewing angle and a second viewing angle. Each of the first and second video data include r×c sets of pixel data, wherein r and c are natural numbers greater than 1. The horizontal calibration apparatus performs horizontal calibration on the first and second video data, and outputs the first and second video data, which are horizontally calibrated. The depth estimation apparatus includes a similarity estimation module, an iteration update module and a control module. The similarity estimation module compares pixel data of the first and second video data, provided by the horizontal calibration apparatus, with each other to obtain initial similarity data, which include r×c initial similarity elements each including d initial similarity elements, wherein d is a natural number greater than 1. The iteration update module selects multiple initial similarity elements to perform an accumulation operation to obtain an iteration parameter according to a reference mask with each of the initial similarity elements serving as a center. The iteration update module performs n times of iteration update operations on the initial similarity data according to the iteration parameter to generate updated similarity data, which include r×c update similarity elements each including d similarity elements. The control module judges whether each of the r×c update similarity elements satisfies a character verification condition. When the r×c update similarity elements satisfy the character verification condition, the control module converts the r×c update similarity elements into depth distribution data.

According to a second aspect of the present disclosure, a depth detection method is provided. The method includes the following steps. First, first video data and second video data, which respectively correspond to a first viewing angle and a second viewing angle, are shot. Each of the first and second video data include r×c sets of pixel data, wherein r and c are natural numbers greater than 1. Next, horizontal calibration is performed on the first and second video data. Then, pixel data of the horizontally calibrated first and second video data are compared with each other to obtain initial similarity data. The initial similarity data include r×c initial similarity elements. Each of the r×c initial similarity data include d initial similarity elements, wherein d is a natural number greater than 1. Next, multiple similarity elements are selected according to a reference mask with each of the similarity elements serving as a center, and an accumulation operation is performed on the selected similarity elements to obtain an iteration parameter. Then, n times of iteration update operations are performed on the initial similarity data according to the iteration parameter to generate r×c update similarity elements each including d similarity elements. Next, it is judged whether each of the r×c update similarity elements satisfies a character verification condition. Then, the r×c update similarity elements are converted into depth distribution data when the r×c update similarity elements satisfy the character verification condition.

The disclosure will become apparent from the following detailed description of the preferred but non-limiting embodiments. The following description is made with reference to the accompanying drawings.

BRIEF DESCRIPTION OF THE DRAWINGS

FIG. 3 is a schematic illustration showing r×c×d initial similarity elements in initial similarity data Dis.

FIG. 4 is a detailed block diagram showing a range estimation apparatus 18 of FIG. 1.

DESCRIPTION OF EMBODIMENTS

Figure 1:
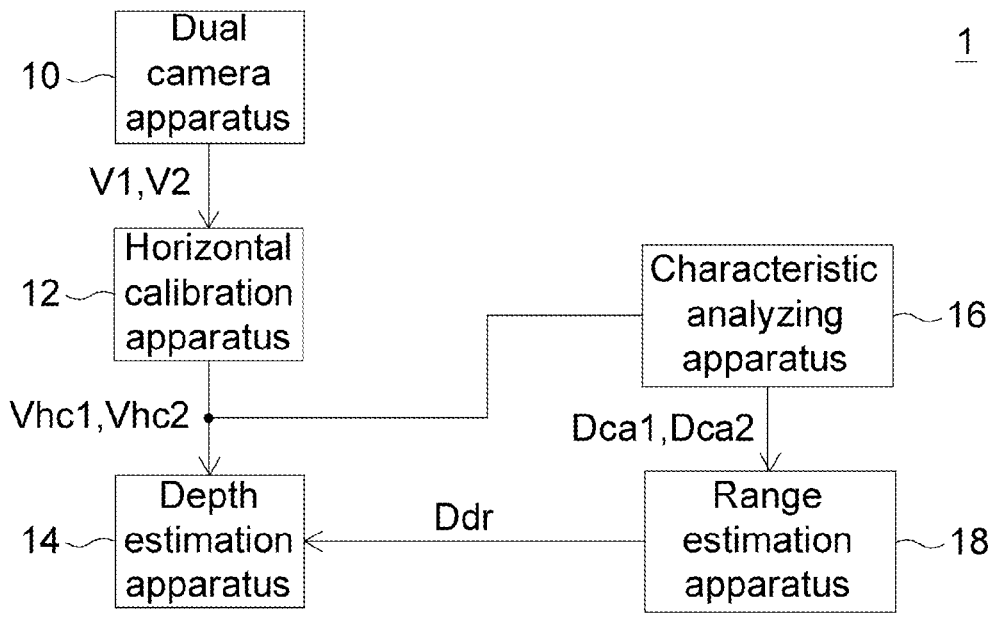
FIG. 1 is a block diagram showing a depth detection system according to an embodiment of the disclosure.

FIG. 1 is a block diagram showing a depth detection system 1 according to an embodiment of the disclosure. Referring to FIG. 1, the depth detection system 1 of this embodiment includes a dual camera apparatus 10, a horizontal calibration apparatus 12 and a depth estimation apparatus 14. The dual camera apparatus 10 shoots video data V1 and V2, which respectively correspond to a first viewing angle and a second viewing angle. For example, the video data V1 and V2 are respectively the video data of the left viewing angle and the right viewing angle shot on the same target. The video data V1 and V2 include, for example, r×c sets of pixel data, wherein r and c are natural numbers greater than 1.

The horizontal calibration apparatus 12 performs horizontal calibration on the video data V1 and V2, and provides horizontally calibrated video data Vhc1 and Vhc2 to the depth estimation apparatus 14.

Figure 2:
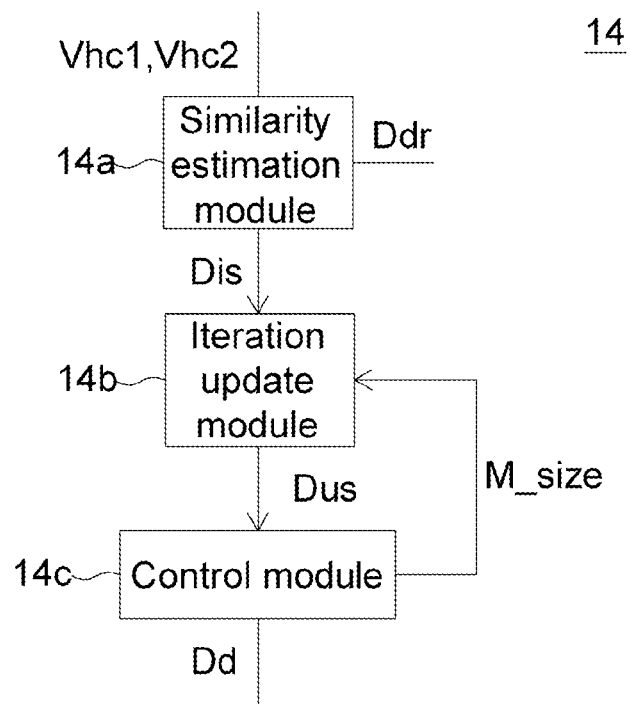
FIG. 2 is a detailed block diagram showing a depth estimation apparatus 14 of FIG. 1.

The depth estimation apparatus 14 generates depth distribution data Dd according to the video data Vhc1 and Vhc2. FIG. 2 is a detailed block diagram showing the depth estimation apparatus 14 of FIG. 1. For example, the depth estimation apparatus 14 includes a similarity estimation module 14a, an iteration update module 14b and a control module 14c.

The similarity estimation module 14a compares pixel data on the video data Vhc1 and Vhc2 to obtain initial similarity data Dis. For example, the initial similarity data Dis include r×c initial similarity elements each including d initial similarity elements, wherein d is a natural number greater than 1. For example, based on each of the r×c sets of pixel data corresponding to the video data Vhc1 of the left viewing angle, the similarity estimation module 14a selects a search window including d sets of pixel data on the video data Vhc2 corresponding to the right viewing angle and compares each set of pixel data in the video data Vhc1 with the d sets of pixel data in the search window to obtain the corresponding d initial similarity elements.

In one example embodiment, in respect of the pixel data Vhc1(R,C) of the video data Vhc1 corresponding to the position (R,C), the similarity estimation module 14a defines a corresponding search window with the pixel data Vhc2(R,C), Vhc2(R,C+1), Vhc2(R,C+2), ..., Vhc2(R,C+d), which are respectively corresponding to the positions (R,C), (R,C+1), (R,C+2), ..., (R,C+d), of the video data Vhc2, wherein R and C are natural numbers respectively smaller than or equal to r and c. The similarity estimation module 14a further compares the pixel data Vhc1(R,C) with each of the sets of pixel data Vhc2(R,C) to Vhc2(R,C+d) in the search window to correspondingly obtain the d initial similarity elements.

For example, each of the d initial similarity elements in each of the r×c initial similarity elements may be represented by the following equation:

$L_0(x,y,z)=\delta(Vhc1,Vhc2,x,y,z)|x=1,2,\ldots,r;y=1,2,\ldots,c;z=1,2,\ldots,d$, wherein the δ function is the similarity function of the image. Because the initial similarity data Dis include the r×c initial similarity elements and each initial similarity element includes the d initial similarity elements, the r×c×d initial similarity elements $L_0(x,y,z)|x=1,2,\ldots,r; y=1,2,\ldots,c; z=1,2,\ldots,d$ in the initial similarity data Dis may be represented by a three-dimensional similarity space, as shown in FIG. 3.

The iteration update module 14b selects multiple similarity elements according to one reference mask M with each similarity element in the three-dimensional similarity space serving as a center, and performs an accumulation operation on the selected similarity elements to obtain an iteration parameter $P_n(n=0, 1, \ldots, N)$. The iteration update module 14b further performs N times of iteration update operations on the initial similarity data Dis according to the iteration parameter to generate updated similarity data Dus according to the initial similarity data Dis, wherein N is a natural number greater than 1. Similar to the initial similarity data Dis, the updated similarity data Dus include r×c initial similarity elements, wherein each of the r×c update similarity elements includes d update similarity elements.

For example, the iteration update module 14b performs the iteration update operation on the initial similarity data Dis according to the iteration parameter and according to the following function:

$L_{n+1}(x,y,z)=L_0(x,y,z) \times P_n | n=0,1,\ldots,N$

The iteration parameter $P_n$, relates to the accumulation function $S_n(x,y,z)$. For example, the iteration parameter $P_n$, and the accumulation function $S_n(x,y,z)$ respectively satisfy, for example, the following equations:

$$S_n(x,y,z) = \sum_{(r',c',d')} L_n(x+r', y+c', z+d')$$

$$P_n = \left( \frac{S_n(x,y,z)}{\sum_{(r'',c'',d'') \in \varphi(x,y,z)} S_n(r'', c'', d'')} \right)^\alpha$$

wherein x+r', y+c' and z+d' represent the reference range selected from the three-dimensional similarity space of FIG. 3 using the reference mask M with the size of r'×c'×d' and with the coordinates (x,y,z) serving as the center on the condition that the similarity element $L_0(x,y,z)$ corresponding to the pixel data Vhc1(x,y) serves as a center point; α is a constant parameter; the accumulation function $S_n(x,y,z)$ represents the accumulation operation of the similarity elements performed on the selected reference range; and the function $$\sum_{(r'',c'',d'') \in \varphi(x,y,z)} S_n(r'', c'', d'')$$

represents the reference summation parameter of the accumulation function $S_n(x,y,z)$ in another selected reference range φ(x,y,z).

The control module 14c receives the updated similarity data Dus and judges whether each of the r×c update similarity elements in the updated similarity data Dus satisfies a character verification condition. In one example embodiment, the character verification condition is whether each of the r×c update similarity elements obviously has one unique update similarity element. For example, the control module 14c substrates an summation average thereof from the d update similarity elements of the r×c update similarity elements, and judges whether the obtained value is greater than a threshold value to judge whether each of the r×c update similarity elements obviously has the unique update similarity element.

When each of the r×c update similarity elements includes one unique update similarity element, it represents that each of the r×c sets of pixel data of the video data Vhc1 may be mapped to the r×c sets of pixel data of the video data Vhc2 through the r×c unique update similarity elements in the updated similarity data Dus. Thus, the control module 14c can obtain the horizontal displacement quantity of each of the r×c sets of pixel data of the video data Vhc1, and the horizontal displacement quantities indicate the horizontal displacements of each of the r×c sets of pixel data of the video data Vhc1 relative to the pixel data of the video data Vhc2 having the same image content. Based on the condition that the horizontal distance between the pixel data of the video data Vhc1 and Vhc2 relates to the depth of its corresponding image content, the control module 14c generates the depth distribution data Dd according to the horizontal displacement quantity.

When each of the r×c update similarity elements does not include the unique update similarity element, it represents that each of the r×c update similarity elements cannot definitely indicate the corresponding relationship between the r×c sets of pixel data of the video data Vhc1 and Vhc2. Thus, the control module 14c cannot obtain the horizontal displacement quantity, relative to the pixel data of the video data Vhc2, of each of the r×c sets of pixel data of the video data Vhc1 and the corresponding depth distribution data Dd. In this case, the control module 14c adjusts the size of the reference mask M to try to refer to more update similarity elements (i.e. select more sets of pixel data by a larger mask in the video data V1) by enlarging the size of the reference mask M when calculating the accumulation function $S_n(x,y,z)$. Thus, the opportunity of referring to the mask of the video data V1 with the texture characteristic can be increased.

Thereafter, the control module 14c transfers the size (M_size) of the reference mask M back to the iteration update module 14b to drive the iteration update module 14b to recalculate the iteration parameter according to the adjusted reference mask M, and to regenerate the updated similarity data according to the recalculated iteration parameter. The control module 14c further judges whether each of the r×c update similarity elements in the updated similarity data Dus satisfies the character verification condition according to the regenerated updated similarity data Dus. If so, the control module 14c may generate the depth distribution data Dd according to the updated similarity data Dus. If not, the control module 14c again adjusts the size of the reference mask M and repeats the above-mentioned operation. Thus, the depth detection system 1 according to the embodiment of the disclosure can obtain the similarity data relating to the video data Vhc1 and Vhc2, which has the higher reliability, by the method of dynamically adjusting the size of the reference mask M, so that the depth distribution data Dd with the higher reliability can be obtained.

In one example, the depth detection system 1 according to the embodiment of the disclosure further includes a characteristic analyzing apparatus 16 for analyzing the characteristic region in the horizontally calibrated video data Vhc1 and Vhc2, and a range estimation apparatus 18 for estimating the possible depth range of the video data Vhc1 and Vhc2 according to the analyzed result of the characteristic region to generate depth range data Ddr.

More specifically speaking, the characteristic analyzing apparatus 16 receives and analyzes the video data Vhc1 and Vhc2 provided by the horizontal calibration apparatus 12 to obtain characteristic region data Dca1 from the video data Vhc1, and to obtain characteristic region data Dca2 from the video data Vhc2, wherein each of the characteristic region data Dca1 and Dca2 includes multiple sets of corresponding minutia point data. For example, the characteristic analyzing apparatus 16 obtains multiple sets of minutia point data by the object dividing technology to indicate several image content objects in the video data Vhc1 and thus to obtain the characteristic region data Dca1. For example, the characteristic region data Dca1 include the video data of the video data Vhc1 for displaying the user's hand (usually having the minimum depth), and the video data of the background region (usually having the maximum depth) in the video data. The same object dividing technology is also applied to the video data Vhc2 to obtain the characteristic region data Dca2 from the video data Vhc2, wherein the characteristic region data Dca2 include multiple sets of minutia point data corresponding to the minutia point data in the characteristic region data Dca1.

FIG. 4 is a detailed block diagram showing the range estimation apparatus 18 of FIG. 1. Referring to FIG. 4, the depth range estimation apparatus 18 includes, for example, an estimation module 18a, a statistics module 18b and an operation module 18c. The estimation module 18a calculates multiple horizontal displacement quantities between each minutia point in the characteristic region data Dca1 and each corresponding minutia point in the characteristic region data Dca2, and thus converts the horizontal displacement quantities into multiple sets of depth data. Similar to the operation of the control module 14c, the estimation module 18a obtains the depth data Ddc for indicating its corresponding estimated depths according to the horizontal displacement quantities between the characteristic region data Dca1 in the video data Vhc1 and the characteristic region data Dca2 in the video data Vhc2.

The statistics module 18b converts the depth data Ddc into depth statistics distribution data Ddch, and counts the number of minutia points, which may be accumulated on a range of multiple possible depths. For example, the depth statistics distribution data Ddch may be represented by a statistics histogram to indicate the relationship between the depth value and the number of the minutia points thereon.

The operation module 18c obtains a minimum depth value and a maximum depth value from the depth statistics distribution data Ddch according to a critical condition, determines the depth range data Ddr corresponding to the video data Vhc1 and Vhc2 according to the minimum and maximum depth values, and outputs the depth range data Ddr to the depth estimation apparatus 14. For example, the critical condition is the critical number of the minutia points corresponding to the same depth value. When the minimum depth value is searched, the operation module 18c starts the search from the corresponding minimum depth in the depth statistics distribution data Ddch. Once the number of the corresponding minutia points is found to be greater than or equal to the critical number of the minutia points, the operation module 18c serves as the minimum depth value. Similarly, when the maximum depth value is searched, the operation module 18c starts the search from the corresponding maximum depth of the depth statistics distribution data Ddch to find the maximum depth where the number of the corresponding minutia points is greater than or equal to of the critical number of the minutia points.

Thus, the depth estimation apparatus 14 can generate the depth distribution data Dd based on the depth range data Ddr. For example, the similarity estimation module 14a in the depth estimation apparatus 14 can determine the value d (i.e., the size of the search window for similarity calculation) according to the depth range data Ddr.

Figure 5:
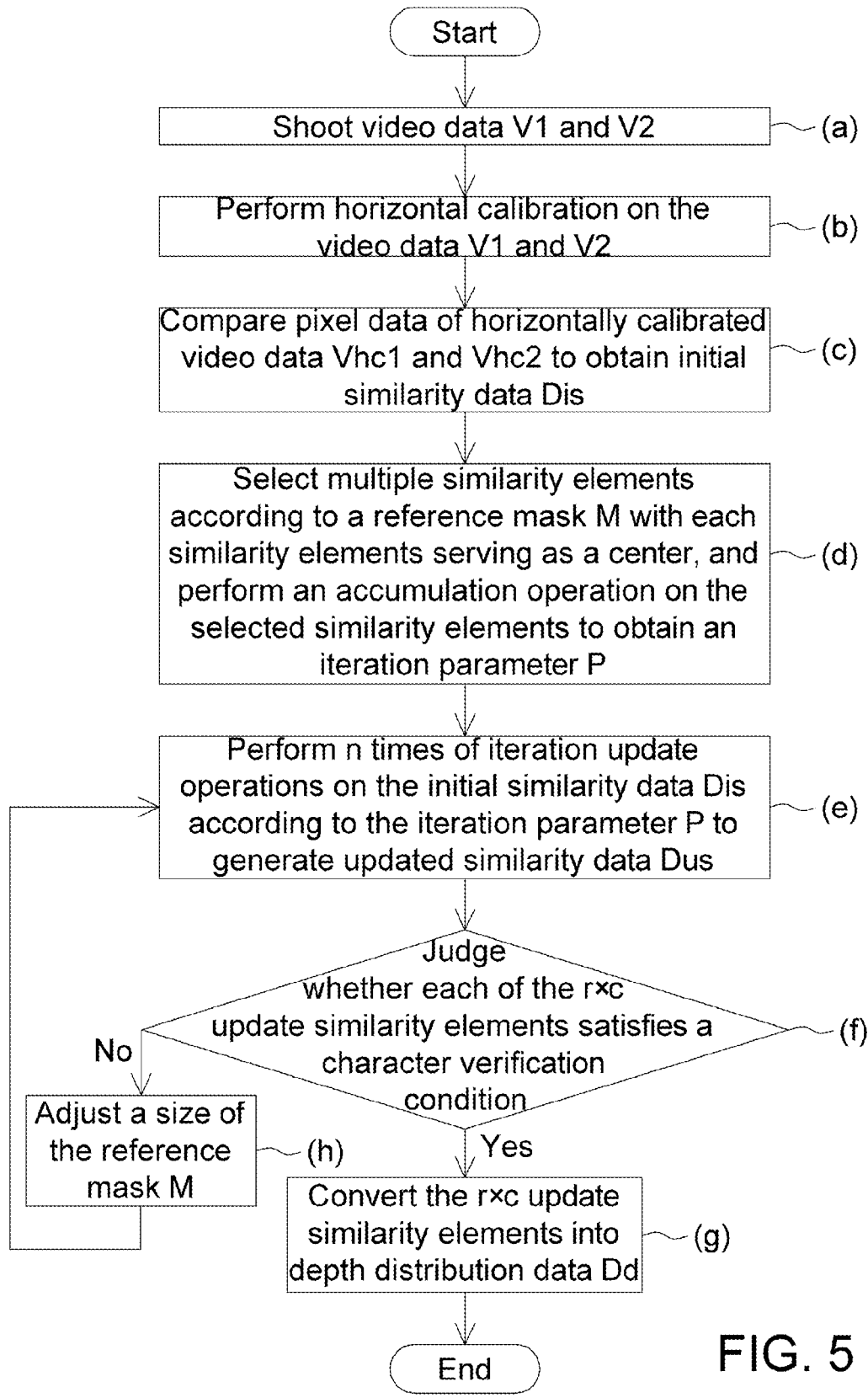
FIG. 5 is a flow chart showing a depth detection method according to the embodiment of the disclosure.

FIG. 5 is a flow chart showing a depth detection method according to the embodiment of the disclosure. First, as shown in step (a), the dual camera apparatus 10 shoots the video data V1 and V2, which respectively correspond to the first viewing angle (e.g., the left viewing angle) and the second viewing angle (e.g., the right viewing angle), wherein each of the video data V1 and V2 includes r×c sets of pixel data. Next, as shown in step (b), the horizontal calibration apparatus 12 performs horizontal calibration on the video data V1 and V2 to provide horizontally calibrated video data Vhc1 and Vhc2.

Then, as shown in step (c), the similarity estimation module 14a of the depth estimation apparatus 14 compares the pixel data of the video data Vhc1 and Vhc2 to obtain the initial similarity data Dis, which include r×c×d initial similarity elements. Next, as shown in step (d), the iteration update module 14b of the depth estimation apparatus 14 selects multiple similarity elements according to the reference mask M with each similarity element serving as the center, and performs the accumulation operation on the selected similarity element to obtain the iteration parameter $P_n$.

Next, as shown in step (e), the iteration update module 14b further performs n times of iteration update operations on the initial similarity data Dis according to the iteration parameter $P_n$ to generate the r×c update similarity elements (i.e., the r×c×d initial similarity elements) according to the r×c initial similarity elements (i.e., the r×c×d initial similarity elements). Then, as shown in step (f), the control module 14c judges whether each of the r×c update similarity elements satisfies a character verification condition. If so, step (g) is performed so that the control module 14c converts the r×c update similarity elements into the depth distribution data Dd. If not, step (h) is performed so that the control module 14c adjusts the size of the reference mask M and then the steps (d), (e) and (f) are repeated to repeatedly obtain the iteration parameter $P_n$, generate the r×c update similarity elements and judge whether each of the r×c update similarity elements satisfies the character verification condition. After the step (f), the step (g) is performed if each of the r×c update similarity elements satisfies the character verification condition, and steps (h) and (d) to (f) are repeated if each of the r×c update similarity elements does not satisfy the character verification condition.

Figure 6:
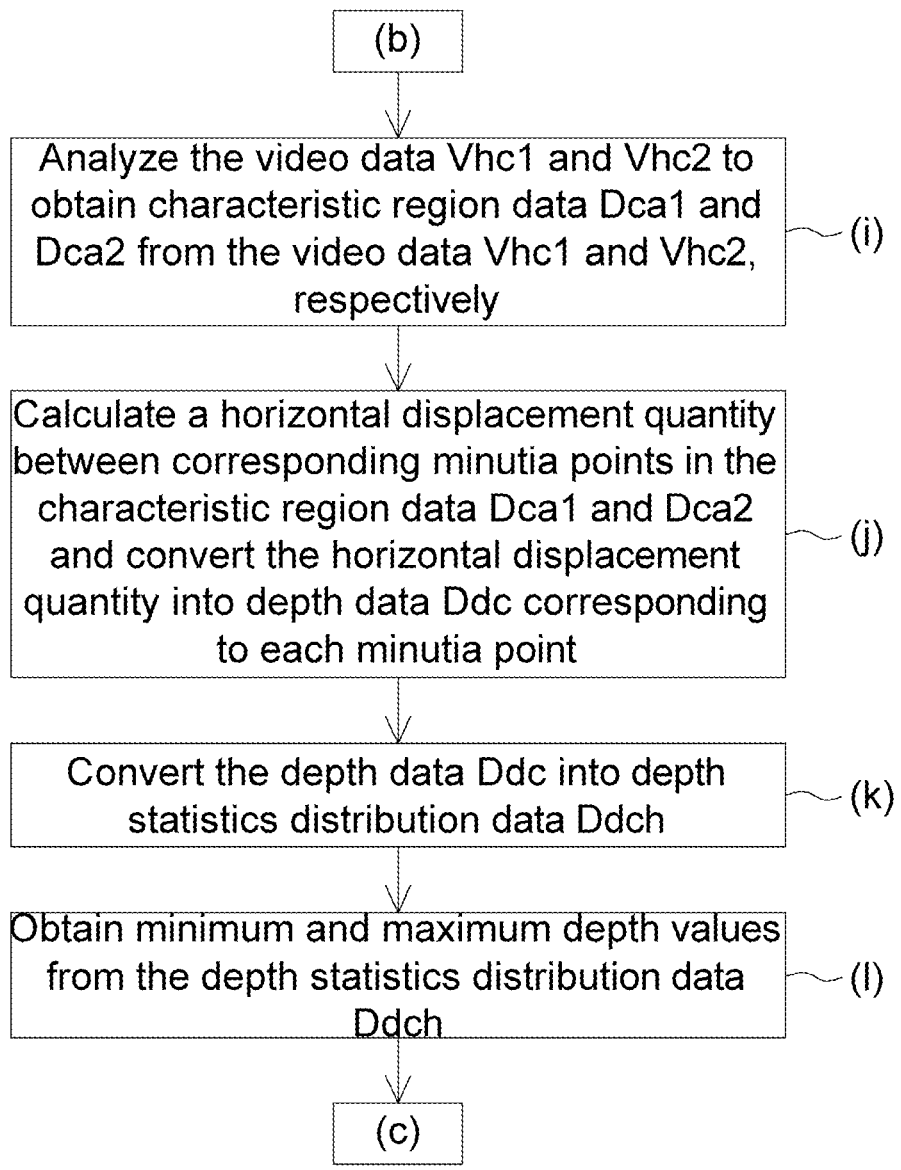
FIG. 6 is a partial flow chart showing the depth detection method according to the embodiment of the disclosure.

FIG. 6 is a partial flow chart showing the depth detection method according to the embodiment of the disclosure. In one example, the method further includes, between the steps (b) and (c), the steps (i) to (l) for calculating the depth range data Ddr to speed up the operation of the step (c). As shown in the step (i), the characteristic analyzing apparatus 16 analyzes the horizontally calibrated video data Vhc1 and Vhc2 to obtain the characteristic region data Dca1 from the video data Vhc1 and obtain the characteristic region data Dca2 from the video data Vhc2. The characteristic region data Dca1 and Dca2 include several corresponding pairs of minutia points. Next, as shown in the step (j), the estimation module 18a calculates the horizontal displacement quantities between the minutia points of the characteristic region data Dca1 and Dca2, and converts the horizontal displacement quantities into the depth data Ddc corresponding to each of the minutia points.

Then, as shown in the step (k), the statistics module 18b converts the depth data Ddc into the depth statistics distribution data Ddch. Thereafter, as shown in the step (l), the operation module 18c obtains the minimum depth value and the maximum depth value from the depth statistics distribution data Ddch according to a critical condition, and determines the depth range data Ddr corresponding to the video data Vch1 and Vch2 according to the minimum and maximum depth values.

The depth detection system according to the embodiment of the disclosure adopts the depth estimation apparatus to estimate the similarity data of the pixel data between the left viewing angle video data and the right viewing angle video data; generates the converging parameter through the reference mask according to the similarity data in a selected reference region; and performs the cyclic iteration operation on the similarity data according to the converging parameter to obtain the disparity of each pixel data in the left viewing angle/right viewing angle video data. The depth detection system according to the embodiment of the disclosure further adopts the depth estimation apparatus to verify the disparity, and selectively adjusts the size of the reference mask according to the verified result to obtain the disparity of each pixel data with the higher reliability and the correspondingly generated depth information. Thus, compared with the conventional depth detection system, the depth detection system according to the embodiment of the disclosure generates the depth information with the higher reliability.

In addition, the depth detection system according to the embodiment of the disclosure further adopts the characteristic analyzing apparatus and the range estimation apparatus to obtain the possible depth range for the left viewing angle video data and the right viewing angle video data. Thus, the depth detection system according to the embodiment of the disclosure further increases the operation speed of obtaining the initial similarity data and the depth information.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A depth detection system, comprising:
a dual camera apparatus for shooting first video data and second video data, which respectively correspond to a first viewing angle and a second viewing angle, wherein each of the first and second video data comprise r×c sets of pixel data, wherein r and c are natural numbers greater than 1;
a horizontal calibration apparatus for performing horizontal calibration on the first and second video data, and outputting the first and second video data, which are horizontally calibrated; and
a depth estimation apparatus, comprising:
a similarity estimation module for comparing pixel data of the first and second video data, provided by the horizontal calibration apparatus, with each other to obtain initial similarity data, which comprise r×c sets of initial similarity elements, each comprising d initial similarity elements, wherein d is a natural number greater than 1;
an iteration update module for selecting multiple initial similarity elements to perform an accumulation operation to obtain an iteration parameter according to a reference mask with each of the initial similarity elements serving as a center, wherein the iteration update module performs n times of iteration update operations on the initial similarity data according to the iteration parameter to generate updated similarity data, which comprise r×c sets of update similarity elements, each comprising d similarity elements;
a control module for judging whether each of the r×c sets of update similarity elements satisfies a character verification condition; wherein when the r×c sets of update similarity elements satisfy the character verification condition, the control module converts the r×c sets of update similarity elements into depth distribution data;
a characteristic analyzing apparatus for receiving and analyzing the first and second video data provided by the horizontal calibration apparatus to obtain first characteristic region data and second characteristic region data according to the first and second video data, respectively, wherein the first characteristic region data respectively correspond to the second characteristic region data, and the first characteristic region data and the second characteristic region data correspond to a plurality of minutia points; and a depth range estimation apparatus, which comprises:
an estimation module for receiving and calculating a horizontal displacement quantity between the first characteristic region data and the corresponding second characteristic region data, and converting the horizontal displacement quantity into depth data;
a statistics module for converting the depth data into a set of depth statistics distribution data; and
an operation module for obtaining a minimum depth value and a maximum depth value from the set of depth statistics distribution data according to a comparison between a number of the minutia points and a critical number corresponding to a first critical condition, and determining depth range data corresponding to the first and second video data according to the minimum and maximum depth values;
wherein the depth estimation apparatus determines the depth distribution data based on the depth range data.

2. The system according to claim 1, wherein when the r×c sets of update similarity elements do not satisfy the character verification condition, the control module adjusts a size of the reference mask, and drives the iteration update module to again calculate the iteration parameter according to the adjusted reference mask and again generate the updated similarity data comprising the r×c sets of update similarity elements according to the recalculated iteration parameter.

3. The system according to claim 2, wherein:
the control module further judges whether the re-obtained r×c sets of update similarity elements satisfy the character verification condition; and
when each of the re-obtained r×c sets of update similarity elements satisfies the character verification condition, the control module converts the re-obtained r×c sets of update similarity elements into the depth distribution data.

4. The system according to claim 3, wherein when each of the re-obtained r×c sets of update similarity elements still does not satisfy the character verification condition, the control module again adjusts the size of the reference mask, and drives the iteration update module to again calculate the iteration parameter according to the adjusted reference mask, and again generate the updated similarity data comprising the r×c sets of update similarity elements according to the recalculated iteration parameter.

5. A depth detection method, comprising the steps of:
shooting first video data and second video data, which respectively correspond to a first viewing angle and a second viewing angle, wherein each of the first and second video data comprise r×c sets of pixel data, wherein r and c are natural numbers greater than 1;
performing horizontal calibration on the first and second video data;
comparing pixel data of the horizontally calibrated first and second video data with each other to obtain initial similarity data, wherein the initial similarity data comprise r×c sets of initial similarity elements, and each of the r×c sets of initial similarity data comprise d initial similarity elements, wherein d is a natural number greater than 1;
selecting multiple similarity elements according to a reference mask with each of the similarity elements serving as a center, and performing an accumulation operation on the selected similarity elements to obtain an iteration parameter;
performing n times of iteration update operations on the initial similarity data according to the iteration parameter to generate r×c sets of update similarity elements, each comprising d similarity elements;
judging whether each of the r×c sets of update similarity elements satisfies a character verification condition; and
converting the r×c sets of update similarity elements into depth distribution data when the r×c sets of update similarity elements satisfy the character verification condition;
wherein:
before the step of obtaining the initial similarity data, further comprising the steps of:
analyzing the horizontally calibrated first and second video data to obtain first characteristic region data from the first video data and to obtain second characteristic region data from the second video data, wherein the first characteristic region data correspond to the second characteristic region data, and the first characteristic region data and the second characteristic region data correspond to a plurality of minutia points;
calculating a horizontal displacement quantity between the first characteristic region data and the corresponding second characteristic region data, and converting the horizontal displacement quantity into depth data;
converting the depth data into one set of depth statistics distribution data; and
obtaining a minimum depth value and a maximum depth value from the set of depth statistics distribution data according to a comparison between a number of the minutia points and a critical number corresponding to a first critical condition, and determining depth range data corresponding to the first and second video data according to the minimum and maximum depth values.

6. The method according to claim 5, further comprising the step of:
adjusting a size of the reference mask when the r×c sets of update similarity elements do not satisfy the character verification condition;
wherein after the size of the reference mask is adjusted, the steps of obtaining the iteration parameter, generating the r×c sets of update similarity elements and judging whether each of the r×c sets of update similarity elements satisfies the character verification condition are repeated.

7. The method according to claim 6, further comprising the step of:
converting the re-obtained r×c sets of update similarity elements into the depth distribution data when each of the re-obtained r×c sets of update similarity elements satisfies the character verification condition.

8. The method according to claim 7, further comprising the step of:
repeating the step of adjusting the size of the reference mask when each of the re-obtained r×c sets of update similarity elements still does not satisfy the character verification condition;
wherein after the size of the reference mask is adjusted, the steps of obtaining the iteration parameter, generating the r×c sets of update similarity elements and judging whether each of the r×c sets of update similarity elements satisfies the character verification condition are repeated.

* * * * *